US008398252B2

(12) United States Patent
Luepfert

(10) Patent No.: US 8,398,252 B2

(45) Date of Patent: Mar. 19, 2013

(54) FLEXIBLE SELF-SUPPORTING REFLECTOR FOR A PARABOLIC TROUGH

(75) Inventor: Eckhard Luepfert, Cologne (DE)

(73) Assignee: Deutsches Zentrum fuer Luft- und Raumfahrt E.V. (DE)

( * ) Notice: Subject to any disclaimer, the term of this patent is extended or adjusted under 35 U.S.C. 154(b) by 230 days.

(21) Appl. No.: 12/934,176

(22) PCT Filed: Apr. 3, 2009

(86) PCT No.: PCT/EP2009/054017

§ 371 (c)(1), (2), (4) Date: Sep. 23, 2010

(87) PCT Pub. No.: WO2009/127538

PCT Pub. Date: Oct. 22, 2009

(65) Prior Publication Data

US 2011/0017203 A1 Jan. 27, 2011

(30) Foreign Application Priority Data

Apr. 16, 2008 (DE) ........................ 10 2008 018 963

(51) Int. Cl.
*G02B 5/08* (2006.01)

(52) U.S. Cl. ....................................................... 359/883

(58) Field of Classification Search .................. 359/883, 359/838, 853

See application file for complete search history.

(56) References Cited

U.S. PATENT DOCUMENTS

| | | | |
|---|---|---|---|
| 466,263 A | | 12/1891 | Scholfield |
| 4,022,184 A | | 5/1977 | Anderson |
| 4,179,181 A | * | 12/1979 | Chang .......................... 359/589 |
| 4,487,196 A | | 12/1984 | Murphy |
| 5,982,546 A | | 11/1999 | Kawamoto et al. |
| 2006/0260605 A1 | * | 11/2006 | Connor ......................... 126/561 |

FOREIGN PATENT DOCUMENTS

| | | | |
|---|---|---|---|
| DE | 2708499 | A1 | 8/1978 |
| DE | 19705046 | A1 | 2/1998 |
| DE | 102004054755 | A1 | 2/2006 |
| EP | 1640657 | A1 | 3/2006 |
| FR | 2396245 | | 1/1979 |

OTHER PUBLICATIONS

Naumann, Helmut and Schroeder, Gottfried, Bauelemente der Optik, Taschenbuch d. technischen Optik, , pp. 65-69, ISBN 3-446-14960-0 Muenchen; Wien: Hanser, 1987, Bibliothek Des Deutschen Patentamts Jan. 14, 1988.

* cited by examiner

*Primary Examiner* — Euncha Cherry

(74) *Attorney, Agent, or Firm* — Clements Bernard PLLC; Gregory Clements

(57) ABSTRACT

The invention relates to a self-supporting reflector for a parabolic trough, the parabolic trough itself, a process for preparing the reflector, a process for preparing the parabolic trough, and the use of the reflector.

12 Claims, No Drawings

FLEXIBLE SELF-SUPPORTING REFLECTOR FOR A PARABOLIC TROUGH

FIELD OF THE INVENTION

The invention relates to a flexible self-supporting reflector for a parabolic trough, the parabolic trough itself, a process for preparing the reflector, a process for preparing the parabolic trough, and the use of the reflector.

DESCRIPTION OF RELATED ART

Parabolic mirrors for converging solar radiation in collectors for recovering heat and electric power are equipped with curved mirrors to concentrate the sunlight to the focal point.

Such mirrors are usually prepared from glass, aluminum or plastic sheets.

The most common material for concentrating sunlight is float glass mirror-coated on the backside. In most applications of large-scale installations (Almeria, Calif., . . . ), so-called thick sheet glass is employed for heliostats of solar power tower plants and for the parabolic shape of trough collectors.

In other cases, thin sheet glass on a support, for example, made of sheet steel, is employed. Special examinations have been made relating to the qualification of mirror-coated aluminum sheet or other materials mirror-coated on the front side. A thin plastic reflector film is also employed.

For the utilization of solar radiation for energy supply, a high reflectance is required. In order to achieve economic viability, high quality mirrors must be used. Glass mirrors with reflectance values of 90% and more, based on the solar spectrum, set the standard.

During the operation of such concentrating collectors, it is required to keep the reflector surface free from soil by washing.

To date, glass has been the only material that proved to be permanently resistant to degradation under the weather conditions of use in solar collectors.

However, an obvious disadvantage of glass is the risk of breaking during the installation, cleaning and maintenance and under environmental impacts such as windstorm and hail. In addition to the resulting material damage, persons are endangered by pieces of broken glass. In addition, dropping fragments cause secondary damage to neighboring glass mirrors or the expensive receiver tube. When broken mirrors are replaced, costs for the necessary work arise.

The preparation of bent mirror facets made of float glass requires a complex process at temperatures around 600° C., followed by the mirror-coating and sealing of the backside.

Parabolic mirrors of glass having dimensions of, for example, 1.60 m×1.70 m, are usually employed for parabolic troughs. Due to the established manufacturing processes for sheet glass, the maximum size of glass elements is 6 m×3.20 m. These conventional mirrors must be bent already before the transport to the installation site and therefore cannot be delivered in a compact way. The transport of these large bent mirrors is a considerable problem.

In addition, some of these mirrors are mirror-coated on the front side, i.e., the mirror layer is on the side facing the sunlight. This has proven to be particularly disadvantageous, since this mirror layer is a metal layer that is thus exposed to the weather, and the optical quality is therefore rapidly decreased.

DE 10 2004 054 755 A1 describes a device for concentrating incident light, wherein a cover of acrylic glass may be provided. Therefore, an additional protective housing is provided in previously known parabolic troughs comprising a metal layer facing the light source.

DE 197 05 046 A1 describes a device for using solar energy, comprising a light-transfer element and a light distributor, wherein the light distributor may consist of a transparent polymer solid.

DE 27 08 499 A1 describes a solar collector consisting of a cylindrical parabolic mirror, wherein the mirror surface is facing the light side and is provided on a polymer substrate.

Thus, it is the object of the present invention to provide an easily prepared and easily transported reflector that is resistant to environmental impacts without additional measures.

SUMMARY OF THE INVENTION

In the broadest sense the invention is a self-supporting reflector for a parabolic trough comprising:

(a) a self-supporting reflector having a reflectance of at least 90%;

(b) said reflector having at least one layer of transparent plastic material for facing a light source; and (c) at least one metal layer contiguous to the layer of plastic material.

DETAILED DESCRIPTION OF THE INVENTION

In a first embodiment, this object of the invention is achieved by a self-supporting reflector for a parabolic trough:

(a) having a reflectance of at least 90%;

(b) comprising at least one layer of a transparent plastic material facing a light source; and (c) at least one metal layer contiguous to the layer according to (b).

The reflector according to the invention has a significantly lower weight as compared to glass or metals, which were previously employed. In addition, the reflector according to the invention has a significantly higher impact resistance as compared to glass. It has substantially more flexible construction properties regarding the shape and processing. In addition, the reflector according to the invention can be excellently produced in extrusion processes. Thermal forming, if at all necessary, is possible at significantly lower temperatures as compared to glass. In addition, the reflector according to the invention does not cause any danger to persons from sharp fragments.

The reflector according to the invention is preferably flexible. Thus, it is particularly simple, for example, to transport the reflector while still flat and to mount it in parabolic shape at the site of destination.

The reflector preferably has a minimum bending radius within a range of from 0.2 to 8 m. Over previously known reflectors, this has the advantage that the reflector according to the invention can be easily transported in roll form, for example.

Alternatively, the reflector may also be rigid, for example. This can be realized by hot forming in the production. This has the advantage that the reflector need not be brought into the desired shape expressly at the site of destination.

For example, the light source is the sun or a device that deflects sunlight onto the reflector.

Advantageously, the self-supporting reflector is bent in only one dimension. For the reflector according to the invention, this has the advantage that it can be delivered in a very compact state, for example, flat or rolled up, and subsequently must merely be bent into parabolic shape, for example.

Its base weight is advantageously within a range of from 1 to 20 kg/m$^2$, more preferably from 2 to 10 kg/m$^2$. Thus, the reflector according to the invention is substantially lighter than previously known reflectors for parabolic troughs, and therefore can not only be transported more easily, but also be installed more readily.

Preferably, the transparent plastic material is selected from polycarbonate, poly(methyl methacrylate), styrene-acrylonitrile polymer and/or polystyrene. These polymers are particularly suitable for the layer facing the light source due to their excellent optical properties.

The metal of the metal layer is advantageously selected from aluminum, silver or gold. Silver is particularly preferred because it reflects the solar spectrum particularly efficiently.

It is particularly advantageous if at least one layer of transparent plastic material has a layer thickness within a range of from 0.1 to 8 mm, especially from 0.5 to 4 mm. More preferably, this layer is the layer facing the light source. The preferred layer thickness has been found particularly suitable for keeping environmental impacts from the metal layer and, on the other hand, being sufficiently thin to reach the high reflectance.

In addition, the reflector according to the invention may preferably be provided with the usual anti-scratch coating.

The layer of transparent plastic material facing the light source may additionally be provided with a UV protection. The latter may be either incorporated in the layer itself, or externally applied to the layer.

The surface of the plastic layer is preferably very smooth on the side facing away from the light. For mirrors, the surface smoothness is usually quantified by the divergence of an incident laser beam. Therefore, the reflector according to the invention causes a divergence of at most 2 mrad in an incident laser beam at a wavelength of 532 nm (green). For this reason, the surface of the plastic layer on the side facing the light is preferably very smooth as well.

Advantageously, a further plastic layer contiguous to the metal layer on the backside thereof may be provided. This layer advantageously has a layer thickness within a range of from 1 to 15 mm.

The metal layer advantageously has a layer thickness within a range of from 0.5 to 500 μm, especially within a range of from 1 to 50 μm. This layer thickness range has the particular advantage that the bending radius of the reflector according to the invention can be significantly reduced thereby, and thus the reflectors according to the invention can be transported substantially more easily.

The reflector preferably has two layers of plastic material that are contiguous to the same metal layer on the front and back sides thereof. Thus, the metal layer is surrounded by plastic material from both sides, and thus is not exposed to the weather on its backside either. The service life of the reflector according to the invention may thus be significantly extended to 20 years or more. In addition, the metal layer is substantially less susceptible to scratches or other mechanical influences during transport.

The length of the reflector is preferably at least 7 m, especially at least 10 m. Thus, for the first time, substantially larger mirrors of parabolic troughs can be employed without wasting space between the individual mirror elements as before.

In another embodiment, the object of the invention is achieved by a parabolic trough comprising the reflectors according to the invention.

In another embodiment, the object of the invention is achieved by a process for preparing a reflector according to the invention, wherein at least one layer of transparent plastic material is coextruded with a metal layer. Advantageously, the metal layer is employed as a foil. Over the previously known processes for preparing reflectors for parabolic troughs, the process according to the invention has the particular advantage that reflectors of basically any size can be produced without necessitating a later thermal forming. In addition, the reflective layer (metal layer) need not be vapor deposited tediously in a vacuum process as before.

In the process according to the invention, the reflectors are brought into parabolic shape advantageously by cold forming. Thus, the final shape of the reflector can be generated also at the site where the parabolic trough is installed.

As mentioned above, the reflector may also be rigid, in which case it may alternatively and preferably be prepared by hot forming. This has the advantage that the reflector need not be brought into its shape expressly at the site of destination.

In a further embodiment, the object of the invention is achieved by the use of the reflector according to the invention in a parabolic trough, in concentrators, especially dish concentrators, or as a decorative façade element for buildings.

Example

The reflector according to the invention was prepared on an extrusion line by melting polycarbonate pellets and pressing the melt through slot dies by means of a screw extruder. During the extrusion, these slot dies were arranged in such a way that a silver foil could be fed in between the forming layers. The silver foil was fed exactly at the same rate as the plastic layers were formed from the extruder. One of the slot dies was selected in such a way that a 0.3 mm thick layer of polycarbonate was formed on one side of the foil, and the other slot die below the foil was selected in such a way that a layer having a thickness of 4 mm was formed there. The silver foil itself had a layer thickness of 25 μm. All in all, a reflector according to the invention having a size of 7 m×0.5 m was produced. This reflector was provided with usual structural elements to generate and maintain the exact parabolic shape. The reflector according to the invention was provided with usual adhesively bonded strengthening elements.

The divergence of a green laser beam was less than 2 mrad. The light reflection of sunlight was at least about 93%.

The invention claimed is:

1. A self-supporting reflector for a parabolic trough:

(a) having a reflectance of at least 90%, based on the solar spectrum;

(b) comprising at least one layer of a transparent plastic material facing a light source and having a layer thickness within a range of from 0.1 mm to 8 mm; and (c) at least one metal layer contiguous to the layer according to (b) and having a layer thickness within a range of from 0.5 μm to 500 μm.

2. The reflector according to claim 1, characterized in that said transparent plastic material is selected from polycarbonate, poly(methyl methacrylate), styrene-acrylonitrile polymer and/or polystyrene.

3. The reflector according to claim 1, characterized in that said metal of the metal layer is selected from Al, Ag and/or Au.

4. The reflector according to claim 1, characterized in that said at least one layer of transparent plastic material has a layer thickness within a range of from 0.5 to 4 mm.

5. The reflector according to claim 1, characterized in that said metal layer has a layer thickness within a range of from 1 to 50 μm.

6. The reflector according to claim 1, characterized by having at least two layers of transparent plastic material that are contiguous to the same metal layer.

7. The reflector according to claim 1, characterized in that the length of the reflector is at least 7 m.

8. A parabolic trough comprising reflectors according to claim 1.

9. A process for preparing a reflector according to claim 1, wherein at least one layer of transparent plastic material is coextruded with a metal layer.

10. A process for preparing a parabolic trough characterized in that the reflectors according to claim 1 are brought into parabolic shape by cold forming.

11. A process for preparing a parabolic trough characterized in that the reflectors according to claim 1 are brought into parabolic shape by warm forming.

12. Use of the reflector according to claim 1 in a parabolic trough, in concentrators or as a decorative façade element for buildings

* * * * *